US007668302B1

(12) United States Patent
Beene et al.

(10) Patent No.: US 7,668,302 B1
(45) Date of Patent: Feb. 23, 2010

(54) SYSTEM AND METHOD FOR REDUCING TOLL CHARGES TO A CUSTOMER SERVICE CENTER USING VOIP

(75) Inventors: Jerry Scott Beene, Bulverde, TX (US); Joel Fred King, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 261 days.

(21) Appl. No.: 11/319,959

(22) Filed: Dec. 28, 2005

(51) Int. Cl.
*H04M 15/00* (2006.01)

(52) U.S. Cl. ............... 379/114.02; 370/352; 370/353; 370/354; 370/355; 370/356; 379/201.01; 379/221.01; 379/222; 379/223; 379/265.01; 379/265.02; 379/265.09; 709/201; 709/202; 709/203; 709/239

(58) Field of Classification Search ........... 379/221.01, 379/220.01, 114.02, 201.01, 222–223, 265.01–265.02, 379/265.09; 370/351–356; 709/201–203, 709/239
See application file for complete search history.

(56) References Cited

U.S. PATENT DOCUMENTS

| | | | | |
|---|---|---|---|---|
| 5,590,182 | A * | 12/1996 | Stevens et al. ............... | 379/130 |
| 5,781,620 | A * | 7/1998 | Montgomery et al. .. | 379/114.02 |
| 5,878,126 | A | 3/1999 | Velamuri et al. | |
| 6,011,844 | A * | 1/2000 | Uppaluru et al. ........ | 379/220.01 |
| 6,078,652 | A | 6/2000 | Barak | |
| 6,201,804 | B1 * | 3/2001 | Kikinis ........................ | 370/352 |
| 6,205,211 | B1 * | 3/2001 | Thomas et al. .......... | 379/114.06 |
| 6,493,447 | B1 * | 12/2002 | Goss et al. ............. | 379/265.09 |
| 6,614,781 | B1 * | 9/2003 | Elliott et al. ................. | 370/352 |
| 6,646,990 | B1 * | 11/2003 | Gray et al. .................. | 370/238 |
| 6,907,031 | B1 * | 6/2005 | Ehlinger et al. ............. | 370/352 |
| 7,016,343 | B1 * | 3/2006 | Mermel et al. ............... | 370/356 |
| 7,042,999 | B2 | 5/2006 | Goldstein et al. | |
| 7,072,454 | B1 | 7/2006 | Ward | |
| 7,298,834 | B1 * | 11/2007 | Homeier et al. ........ | 379/202.01 |
| 7,391,761 | B1 | 6/2008 | Ruckart et al. | |
| 2002/0044635 | A1 | 4/2002 | Klug | |
| 2002/0176405 | A1 * | 11/2002 | Aijala ........................ | 370/352 |
| 2004/0003070 | A1 | 1/2004 | Fernald et al. | |
| 2004/0022237 | A1 * | 2/2004 | Elliott et al. ................. | 370/356 |
| 2004/0151293 | A1 * | 8/2004 | Jensen et al. ............ | 379/114.02 |
| 2004/0213392 | A1 * | 10/2004 | Crockett et al. ........ | 379/114.01 |
| 2004/0218748 | A1 * | 11/2004 | Fisher ..................... | 379/221.01 |
| 2005/0220288 | A1 | 10/2005 | Huey | |
| 2005/0278262 | A1 * | 12/2005 | Cheliotis et al. ............. | 705/400 |
| 2006/0109971 | A1 * | 5/2006 | Ekstrom et al. ........ | 379/220.01 |
| 2007/0064685 | A1 * | 3/2007 | Crockett et al. ............. | 370/356 |

(Continued)

OTHER PUBLICATIONS

Drew, P. et al., "Next-Generation VoIP Network Architecture," Mutliservice Switching Forum, Mar. 2003, 1-19.

(Continued)

*Primary Examiner*—Hemant Patel

(57) ABSTRACT

A method and system are disclosed where a call center operator having multiple locations, including a call center is able to utilize existing network infrastructure to route telephone communications to the call center to the location where the lowest toll rate is applicable. The telephone communications are converted into data packets and routed to the call center using VoIP technology. No toll would apply to the transmission of the data to the call center.

21 Claims, 3 Drawing Sheets

U.S. PATENT DOCUMENTS

| | | |
|---|---|---|
| 2007/0133775 A1 | 6/2007 | Winkler |
| 2007/0253547 A1 | 11/2007 | Sanchez et al. |
| 2008/0019498 A1 | 1/2008 | Ekstrom et al. |
| 2008/0101567 A1* | 5/2008 | Baudino et al. ........ 379/114.01 |

OTHER PUBLICATIONS

"Investigation as to Whether Certain Calls are Local and Independent Telephone Companies and Competitive Local Exchange Carriers—Local Calling Areas," Sep. 16, 2005, Order No. 24,514, DT 00-223 and DT 00-054, 1-6.

Kuhn, R. et al., "Security Considerations for Voice Over IP Systems: Recommendations of the National Institute of standards and Technology," *National Institute of Standards and Technology; Technology Administration*, U.S. Department of Commerce, Jan. 2005, *NIST SP 800-58*, 1-93.

"VoIP/Internet Voice," FCC Consumer Facts, Mar. 2006, 3 pages.

Waldron, G. et al., "Voice-over-IP: The Future of Communications," Global Internet Policy Initiative: *A Project of Internews and the Center for Democracy and Technology*, Apr. 29, 2002, 1-11.

* cited by examiner

SYSTEM AND METHOD FOR REDUCING TOLL CHARGES TO A CUSTOMER SERVICE CENTER USING VOIP

CROSS REFERENCE TO RELATED APPLICATIONS

This application is related by subject matter to the subject matter disclosed in the following commonly assigned applications, the entirety of which are hereby incorporated by reference herein: U.S. patent application Ser. No. 11/319,837, filed on Dec. 28, 2005, and entitled SYSTEM AND METHOD FOR REDUCING TOLL CHARGES TO A CUSTOMER SERVICE CENTER USING VOIP; and U.S. patent application Ser. No. 11/319,958, filed on Dec. 28, 2005, and entitled SYSTEM AND METHOD FOR REDUCING TOLL CHARGES TO A CUSTOMER SERVICE CENTER USING VOIP.

TECHNOLOGY FIELD

The present disclosure relates to the field of telecommunications and more particularly to the use of voice over internet protocol (VoIP) to reduce toll charges to customer service centers.

BACKGROUND

The telecommunications industry is a highly regulated industry world wide. The rates charged for telephone call may very substantially because of the many rate setting regulatory entities involved. For example, in the United States a long distance call refers to telephone calls made outside a certain area, typically characterized by an area code outside of a local call area. Such long-distance calls carry long-distance charges (tolls) which may vary by nation and between phone companies. Calls between different countries (international calls) usually carry much higher charges.

In the United States, the regulatory scheme is rather complicated. Each State has a public utilities commission (PUC) that regulates public utilities, and that can, in the case of telephone services, set rates for calls taking place within the State. In addition, there is the concept of Local Access and Transport Area (LATA). A LATA is a "geographical area of the United States under the terms of "the Modification of Final Judgment (MFJ) entered by the United States District Court for the District of Columbia in Civil Action number 82-0192 or any other geographic area designated as a LATA in the National Exchange Carrier Association, Inc. Tariff FCC No. 4." Thus there are two types of "long distance" calls. One is an inter-State call, the other is an intra-State inter LATA. LATA boundaries are usually drawn around markets, not necessarily along existing State or area code borders. Some LATAs cross over State boundaries, and area codes and LATAs do not necessarily share boundaries; many LATAs exist in multiple area codes, and many area codes exist in multiple LATAs.

Intra-State inter-LATA long distance refers to a calling area outside of the customer's local LATA but within the customer's State. The calling area may not served by the same carrier used for regular long distance, or may be provided at different rates. Typically, an intra-State inter-LATA long distance can be billed at a higher per-minute rate than inter-State long-distance calls, despite being a shorter distance.

Many companies operate customer service centers where customers can call for information, product support or to initiate a transaction. Typically, these customer service centers operate as a call center or centralized office that answers incoming telephone calls from customers. Call centers operated by a company may be at a single location, or be linked with other centers. Call centers may also be linked to corporate computer networks. The call center may be accessed through a toll-free telephone number so that the calling party is not charged for the call by the carrier. Instead the company operating the call center pays the charges. When a toll free number is dialed the carrier determines where the actual physical destination by using the intelligent network capabilities embedded into the network. The toll-free number is translated into a regular geographic number and routed by the telephone exchange in the normal way. In a call center the call is then typically answered by a telephone system known as an automatic call distributor (ACD) or private branch exchange (PBX). Subsequent routing of the calls are determined by the call center. For example, the call may routed depending upon the location of the caller. Many companies take advantage of the difference in inter-State rates versus intra-State inter-LATA rates by routing call out of State where the rates may be less.

Companies having call centers have a need to take advantage of existing network infrastructure to ensure that toll calls are routed through the lowest cost locations in their system. There is also a need to integrate voice and data communication networks into the operations of call centers to derive the maximum economic benefit.

SUMMARY

Accordingly, a system and method is disclosed for managing voice transmissions in a telecommunication system. The method includes the steps of routing voice transmissions directed to a first destination, to a location where the lowest toll would apply. The voice transmissions are converted into data packets and rerouted back to the first destination over an IP network, where the data packets are converted back to voice signals.

The system includes an IP network connecting a data network in the first destination to the location where the lowest toll would apply. VoIP technology is used to convert the voice communication to data packets that can be transmitted to the first destination. The system and method enable calls to call centers to be accomplished at the lowest rate.

BRIEF DESCRIPTION OF THE DRAWINGS

A more complete appreciation of the system and method and many of the attendant advantages thereof will be readily obtained as the same becomes better understood by reference to the following detailed description when considered in connection with the accompanying drawing; it being understood that the drawings contained herein are not necessarily drawn to scale; wherein.

DETAILED DESCRIPTION OF ILLUSTRATIVE EMBODIMENTS

Figure 1:
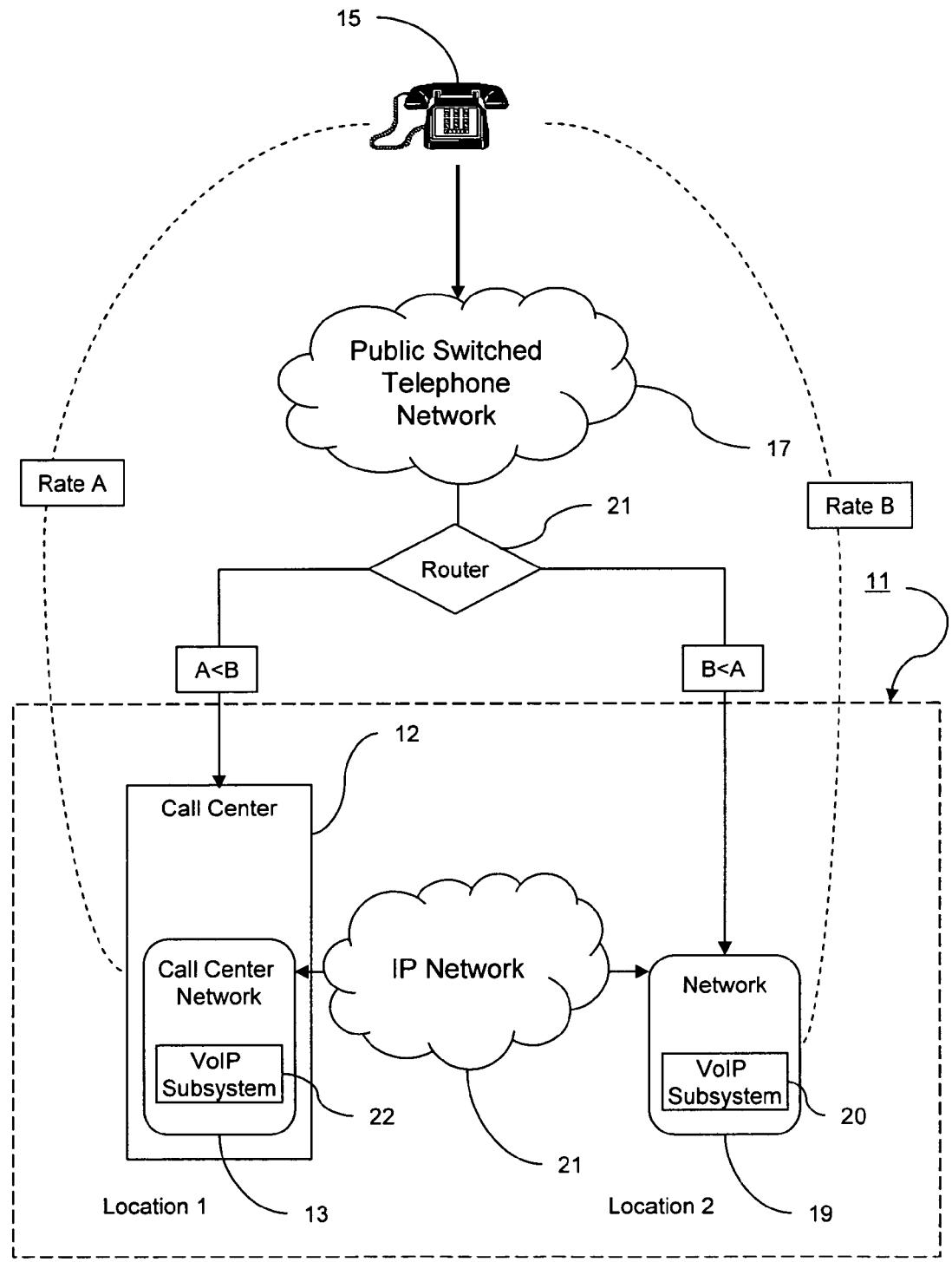
FIG. 1 a high-level illustration of the system for reducing toll charges.

Illustrated in FIG. 1 is a system 11 for reducing toll charges to a customer service center in accordance with this disclosure. The system 11 includes a call center 12 having a first local network (call center network) 13 at location 1, that operates as a call center to respond to calls placed by a customer from a customer telephone 15, through a public switched telephone network (PSTN) 17. The system 11 also includes at least one other local network 19 at location 2 that can receive and process calls from PSTN 17. A voice over internet protocol (VoIP) subsystem 20 is included in the network 19. Network 19 and call center network 13 are connected through a packet switched network 21. Examples of packet switched networks include the internet and private networks that carry data in Transmission Control Protocol/Internet Protocol (TCP/IP). TCP/IP is a set of communications protocols used to connect hosts on the Internet. TCP/IP uses several protocols including TCP and IP. TCP/IP is the de facto standard for transmitting data over networks. A protocol is an agreed format for transmitting data between two devices that determines the type of error checking to be used; data compression method, if any; how the sending device will indicate that it has finished sending a message; how the receiving device will indicate that it has received a message. Clearly there are a number of standard protocols from which programmers can choose. Each has particular advantages and disadvantages.

The system 11 operates in an environment that includes PSTN 17 and a call router 21. The call router 21 routes the call depending on the nature of the call. It should be noted that Area Code Routing (i.e. routing toll-free calls based on the area code of the caller) is a service that is provided by most carriers. So the call router 21 may be operated by the carrier and may be part of the PSTN 17. If the Rate A applicable to calls from customer telephone 15 to call center 12 is lower than the rate B applicable to calls from customer telephone 15 to location 2 then the router would route the call to call center 12. If the Rate B applicable to calls from customer telephone 15 to Location 2 is lower than the rate A applicable to calls from customer telephone 15 to location 1 then the router would route the call to network 19. If the call is routed to Network 19, then a VoIP subsystem 20 would receive the call and convert the voice communication of the call into data packets (using existing VoIP technology) that would be transmitted over the packet switched network 21 to call center network 13.

Voice over Internet Protocol is the routing of voice conversations over the Internet or any other IP-based network. The voice data flows over a general-purpose packet-switched network, instead of traditional dedicated, circuit-switched voice transmission lines. In packet switching, packets (units of information carriage) are individually routed between nodes over data links which might be shared by many other nodes. Packet switching results in the optimization of bandwidth available in a network, and minimizes the time it takes for data to pass across the network. In a packet switched network, a stream of data (e.g. voice transmissions) is broken up into smaller groups of data known as packets. Packets include information about the origin, destination and sequence of the original data. The sequence is needed for re-assembly, at the files destination.

Protocols used to carry voice signals over the IP network are commonly referred to as Voice over IP or VoIP protocols. VoIP traffic might be deployed on any IP network, including the Internet or a private IP network. In general, phone service via VoIP costs less than equivalent service from traditional sources.

An example of such a system 11 would be a call center 12 located in Tampa, Fla. and a network 19 located at a corporate headquarters in San Antonio, Tex. Calls made by customer telephone 15 located in Miami, Fla. to call center 12 located in Tampa, would be charged at a higher rate than calls made from Miami, Fla. to San Antonio, Tex. If the carrier determines that the call is coming from a customer in Miami, then the call would be routed to the network 19 in San Antonio (Location 2). The call would be received by the VoIP subsystem 20 on the network 19 and the voice signal of the call would be converted to IP packets and transmitted over the packet switched network 21 to the call center 12 in Tampa where they are received and handled by a VoIP telephone receiver.

Figure 2:
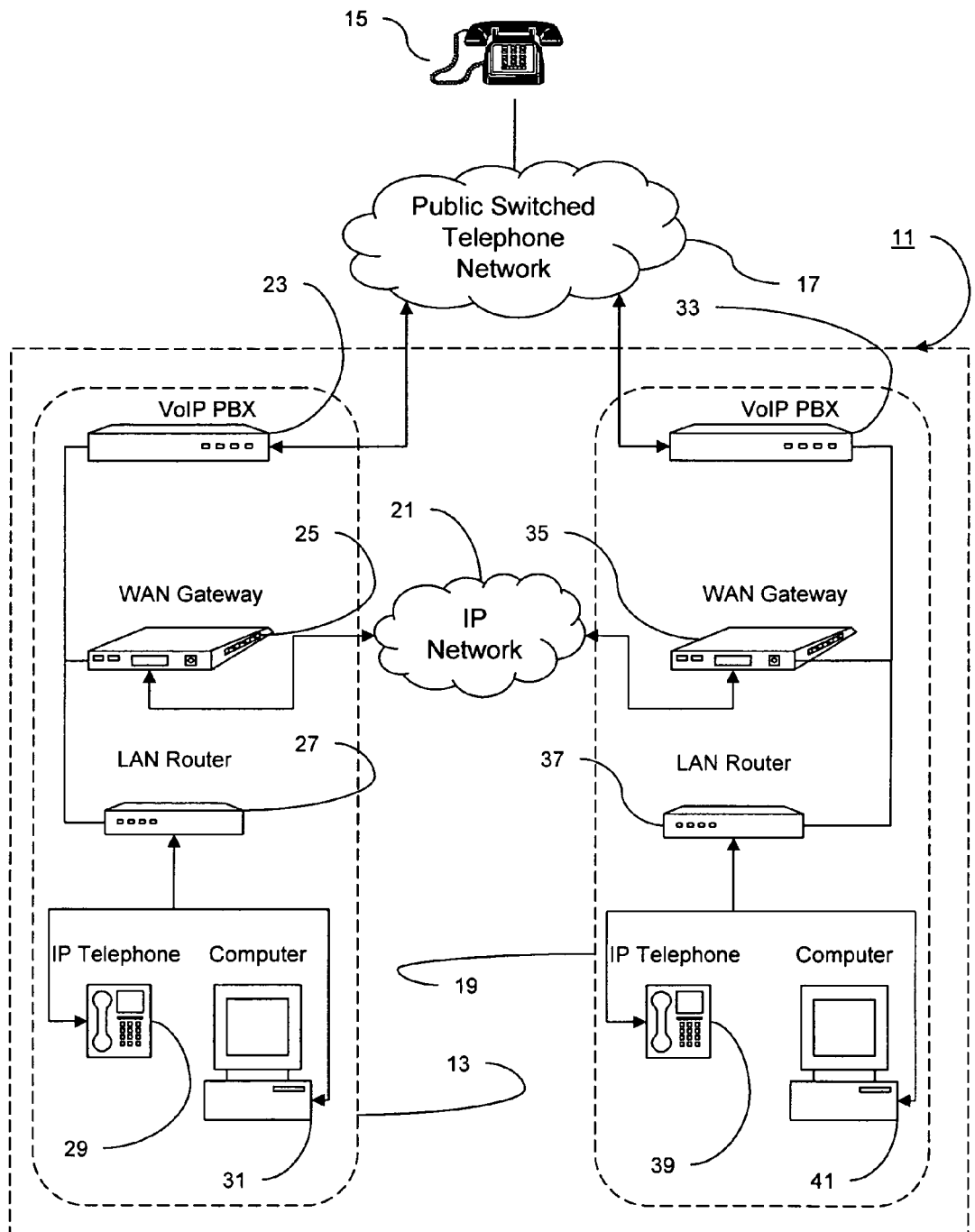
FIG. 2 a more detailed illustration of the system for reducing toll charges and their components.

FIG. 2 provides a more detailed illustration of the components of the system 11. As illustrated in FIG. 2, the call center network 13 may include a Voice over IP private branch exchange (VoIP PBX) 23. VoIP PBX 23 interoperates with most SIP telephones, acting both as registrar and as a gateway between IP phones and the PSTN 17. Like any PBX, VoIP PBX 23 allows a number of attached telephones to make calls to one another, and to connect to other telephone services including the PSTN. Although in this example reference is made to a VoIP PBX a regular PBX that has been IP-enabled, or a server running specialized software would also be able to provide the same function. Many commercially available VoIP PBX's include the capability to convert the analog phone signals into digital signals that can be sent over the call center network 13 and the packet switched network 21. The VoIP PBX 23 may support a wide range of Voice over IP protocols, including SIP and H.323. The call center network 13 also may include at least one wide area network (WAN) gateway 25. WAN gateway 25 is a network node equipped for interfacing with the packet switched network 21. The WAN gateway may contain devices such as protocol translators, impedance matching devices, rate converters, fault isolators, or signal translators as necessary to provide system interoperability.

The call center network may also include one or more local area network (LAN) router 27, a plurality of telephones 29 and a plurality of work stations computers 31. LAN router 27 directs the traffic of the data packets within call center network 13. Telephones 29 may be VoIP telephones or may combine VoIP and analog phone functions in a single device.

Network 19 has similar basic representative components, including a VoIP PBX 33 (or equivalent), a WAN gateway 35 (or equivalent device to connect to the packet switched network 21); a LAN router 37, telephones 19 and computers 41. In operation, voice data from a call routed to the network 19 would be converted into data packets by VoIP PBX 33 and transmitted over the packet switched network 21 to the call center network 13. VoIP PBX 23 would route the data to the IP telephone 29 of the appropriate customer representative, where the data would be converted to voice signals. Similarly voice signals for the customer representative using telephone 29 would be converted to data packets transmitted though the packet switched network 21, converted back to voice signals in network 19 and routed though the PSTN network 17 to the customer using customer telephone 15.

Figure 3:
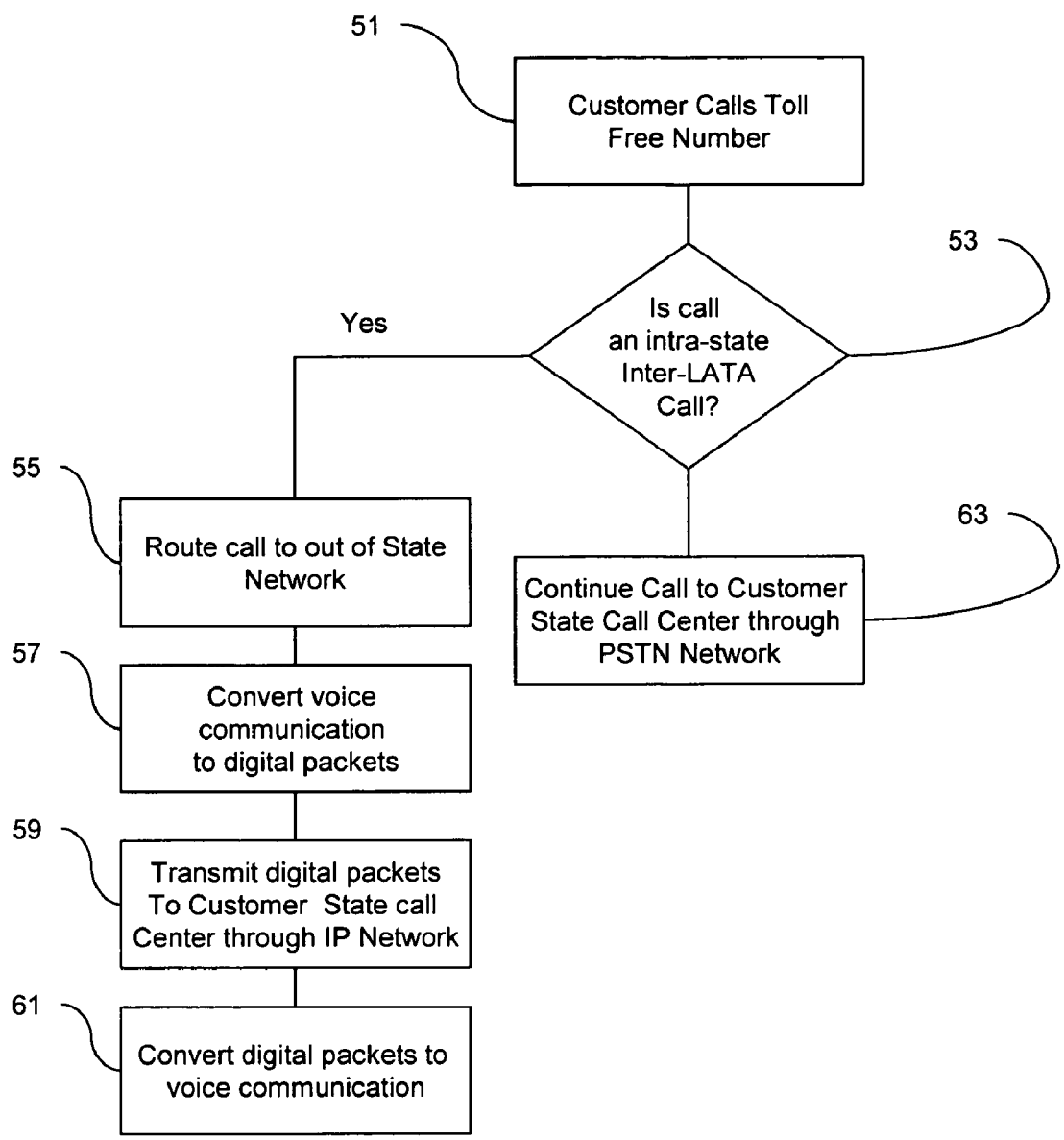
FIG. 3 is a flow diagram of the method for reducing toll charges.

FIG. 3 is a flow diagram of the process implemented by the system in the United States. A customer places a call to a 1-800 number in step 51. The carrier determines which the network that will receive the call in step 53. If the caller and the call center are in the same State and LATA the call would be routed to an out of State network in step 55. The out of State network would convert the analog (or digital) voice communication into digital packets usually thorough the VoIP PBX. The VoIP PBX would route the packets thorough the IP network to the call center in step 59. The packets would then be converted to analog signals in step 61. The end result is that an intra-State Inter LATA call is accomplished at inter-State rates. Although in this example the regulatory scheme applicable to the United States is described, this process would also work where there is a discrepancy in the rates applicable for PSTN calls between any two locations, such as two countries.

It should be understood that the present system and method may utilize any number of hardware components and that the present system and method is not limited to those explicitly described herein.

Although the system and method have been described with reference to specific embodiments, this description is not meant to be construed in a limited sense. Various modifications of the disclosed embodiments, as well as alternative embodiments of the system and method, will become apparent to persons skilled in the art upon reference to the detailed description. It is, therefore, contemplated that the appended claims will cover such modifications that fall within the scope of the description.

What is claimed:

1. A method comprising:
   recognizing a call, at a router, placed to a first location that bears a higher toll than if the call was placed to a second location, a customer support entity having the first location and the second location;
   redirecting the call at the router to the second location only if the call to the first location bears a higher toll than the call to the second location;
   converting voice of a caller associated with the call into data packets at the second location;
   connecting with a packet switched network at the second location; and
   transmitting the data packets representing the voice of the caller over the packet switched network to the customer support entity at the first location.

2. The method of claim 1, further comprising:
   receiving a second set of data packets representing a customer service voice of a customer service representative over the packet switched network from the first location;
   converting the second set of data packets into the customer service voice at the second location; and
   transmitting the customer service voice to the caller.

3. The method of claim 1, wherein the packet switched network operates according to a set of protocols and the transmitting of the data packets is in accordance with the set of protocols.

4. The method of claim 3, wherein the set of protocols include Transmission Control Protocol/Internet Protocol (TCP/IP).

5. The method of claim 4, wherein the packet switched network includes the internet.

6. The method of claim 2, wherein the transmitting of the customer service voice to the caller is through a public switched telephone network.

7. The method of claim 2, wherein the caller is in a first geographic state at a location within a first local access and transport area (LATA), and the customer service representative is in the first geographic state at a location within a second LATA.

8. A system comprising:
   a connection to a toll network;
   a connection to a packet switched network;
   at least one subsystem of a router that recognizes a call to a first location that bears a higher toll than if the call was placed to a second location, a customer support entity having the first location and the second location;
   at least one subsystem of the router than redirects the call to the second location only if the call to the first location bears a higher toll than the call to the second location;
   at least one subsystem that converts voice of a caller associated with the call into data packets at the second location;
   at least one subsystem that connects with the packet switched network at the second location; and
   at least one subsystem that transmits the data packets representing the voice of the caller over the packet switched network to the customer support entity at the first location.

9. The system of claim 8 further comprising:
   at least one subsystem that receives a second set of data packets representing a customer service voice of a customer service representative over the packet switched network from the first location;
   at least one subsystem that converts the second set of data packets into the customer service voice at the second location; and
   at least one subsystem transmitting the customer service voice to the caller.

10. The system of claim 8 wherein the packet switched network operates according to a set of protocols and the transmitting of the data packets is in accordance with the set of protocols.

11. The system of claim 10, wherein the set of protocols include TCP/IP.

12. The system of claim 11, wherein the connecting to the packet switched network includes connecting to the internet.

13. The system of claim 9, wherein the transmitting of the customer service voice to the caller is through a public switched telephone network.

14. The system of claim 9, wherein the caller is in a first geographic state at a location within a first LATA, and the customer service representative is in the first geographic state at a location within a second LATA.

15. A computer-readable storage medium encoded with computer-executable instructions for managing voice calls, said computer-readable instructions comprising:
   instructions to recognize a call, at a router, placed to a first location that bears a higher toll than if the call was placed to a second location, a customer support entity having the first location and the second location;
   instructions to redirect the call at the router to the second location only if the call to the first location bears a higher toll than the call to the second location;
   instructions to convert voice of a caller associated with the call into data packets at the second location;
   instructions to connect with a packet switched network at the second location; and
   instructions to transmit the data packets representing the voice of the caller over the packet switched network to the customer support entity at the first location.

16. The computer-readable instructions of claim 15 further comprising:
   instructions to receive a second set of data packets representing a customer service voice of a customer service representative over the packet switched network from the first location;

instructions to convert the second set of data packets into the customer service voice at the second location; and instructions to transmit the customer service voice to the caller.

17. The computer-readable instructions of claim 15, wherein the packet switched network operates according to a set of protocols and the instructions to transmit the data packets are in accordance to said set of protocols.

18. The computer-readable instructions of claim 17, wherein the set of protocols include TCP/IP.

19. The computer-readable storage medium of claim 17, wherein the packet switched network includes the internet.

20. The computer-readable storage medium of claim 16, wherein the instructions to transmit the customer service voice to the caller is through a public switched telephone network.

21. The computer-readable storage medium of claim 16, wherein the caller is in a first geographic state at a location within a first LATA, and the customer service representative is in the first geographic state at a location within a second LATA.

* * * * *